US011888635B2

(12) United States Patent
Agrawal et al.

(10) Patent No.: US 11,888,635 B2
(45) Date of Patent: Jan. 30, 2024

(54) ELECTRONIC DEVICE THAT MANAGES COMPLIANCE BY A PARTICIPANT DURING A VIDEO COMMUNICATION SESSION

(71) Applicant: MOTOROLA MOBILITY LLC, Wilmington, DE (US)

(72) Inventors: Amit Kumar Agrawal, Bangalore (IN); Jyothsna Bandameedipalli, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 108 days.

(21) Appl. No.: 17/514,477

(22) Filed: Oct. 29, 2021

(65) Prior Publication Data

US 2023/0140607 A1    May 4, 2023

(51) Int. Cl.

| G06F 15/16 | (2006.01) |
| H04L 12/18 | (2006.01) |
| G09B 7/02 | (2006.01) |
| H04L 65/401 | (2022.01) |
| G06V 10/60 | (2022.01) |
| G06V 10/20 | (2022.01) |

(52) U.S. Cl.
CPC ........ *H04L 12/1831* (2013.01); *G06V 10/255* (2022.01); *G06V 10/60* (2022.01); *G09B 7/02* (2013.01); *H04L 12/1822* (2013.01); *H04L 65/4015* (2013.01); *G06V 2201/09* (2022.01)

(58) Field of Classification Search
None
See application file for complete search history.

(56) References Cited

U.S. PATENT DOCUMENTS

| 9,338,400 B1* | 5/2016 | Krishnan | H04L 12/185 |
| 2002/0028430 A1* | 3/2002 | Driscoll | H04L 43/50 |
| | | | 434/322 |
| 2014/0071273 A1* | 3/2014 | Balthasar | G07C 9/37 |
| | | | 348/143 |
| 2015/0127340 A1* | 5/2015 | Epshteyn | G10L 21/00 |
| | | | 704/235 |
| 2015/0312188 A1* | 10/2015 | White | H04L 51/046 |
| | | | 709/204 |
| 2018/0084310 A1* | 3/2018 | Katz | G06N 3/045 |

(Continued)

*Primary Examiner* — Phyllis A Book
(74) *Attorney, Agent, or Firm* — Isidore PLLC

(57) ABSTRACT

An electronic device, computer program product, and method are provided that automatically manages compliance by a participant during a video communication session. The electronic device communicatively connects over a network to second electronic device(s) during a video communication session. The electronic device receives image stream(s) produced respectively by an image capturing device of a corresponding second electronic device. The electronic device identifies person(s) within the image stream(s) and compares to a roster of at least one person expected to join the video communication session to produce attendance data. The electronic device determines participation data related to an amount of time that the person(s) gaze toward the image capturing device of the corresponding second electronic device. The electronic device communicates, to a host output device, the attendance data and the participation data of the person(s) during a duration of the video communication session.

20 Claims, 13 Drawing Sheets

(56) References Cited

U.S. PATENT DOCUMENTS

| | | | |
|---|---|---|---|
| 2019/0108834 A1* | 4/2019 | Nelson | G06N 5/04 |
| 2020/0244711 A1* | 7/2020 | Engel | H04L 65/60 |
| 2020/0382637 A1* | 12/2020 | Cranfill | G06F 21/53 |
| 2021/0185276 A1* | 6/2021 | Peters | G06V 20/41 |
| 2021/0400142 A1* | 12/2021 | Jorasch | H04M 3/567 |
| 2022/0311633 A1* | 9/2022 | Jungwirth | H04L 12/1827 |

\* cited by examiner

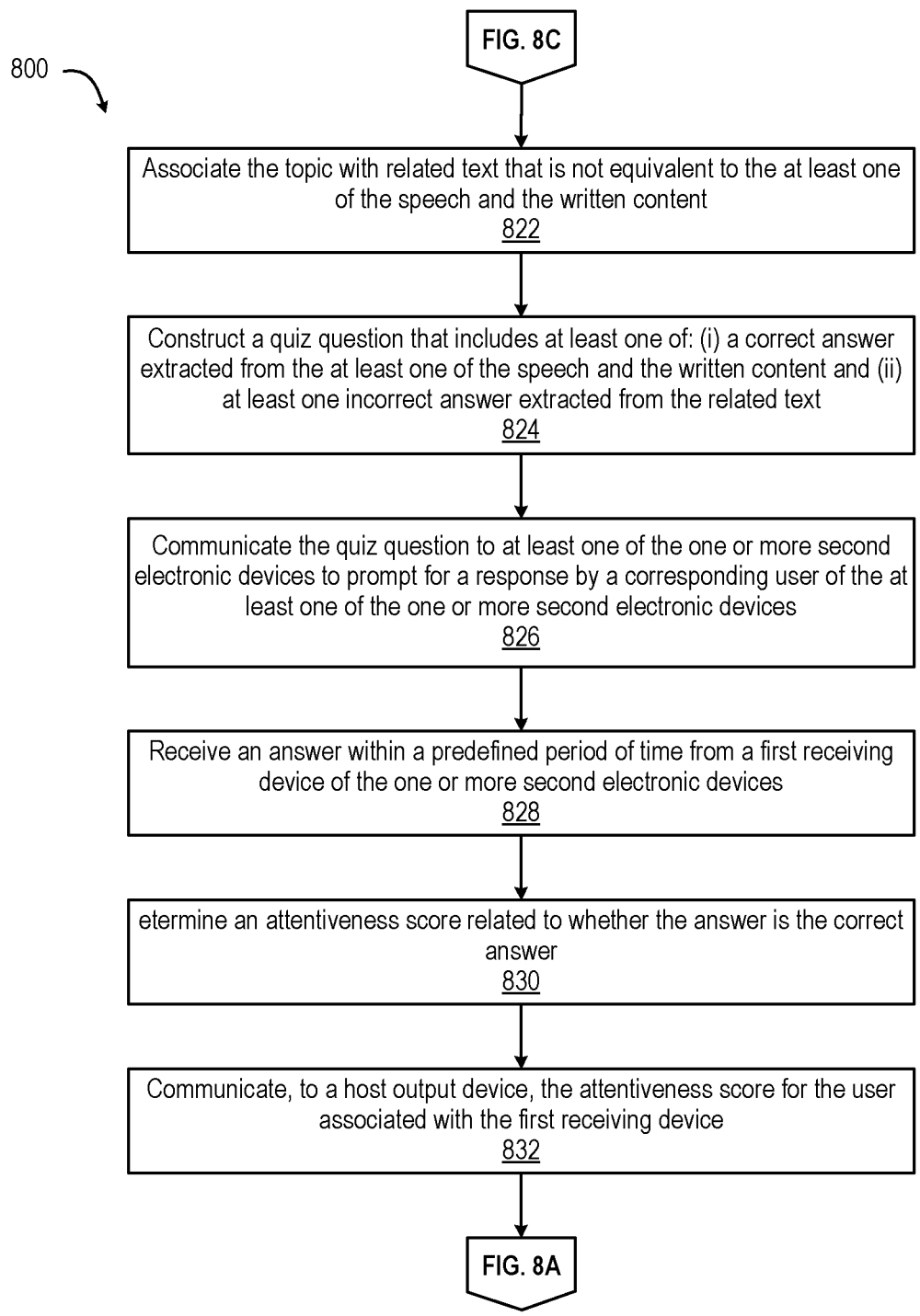

ELECTRONIC DEVICE THAT MANAGES COMPLIANCE BY A PARTICIPANT DURING A VIDEO COMMUNICATION SESSION

BACKGROUND

1. Technical Field

The present disclosure relates generally to electronic devices that support and/or enable video communication sessions with second communication device(s), and more particularly to electronic devices that can visually recognize characteristics of a person in an image stream produced during a video communication session.

2. Description of the Related Art

Electronic devices such as mobile phones, network servers, desktop workstations, laptops, and tablets are often used to participate in or to enable online human communication. So as to simulate an in-person conversation, meeting, or lecture, each participant in a video communication session generally positions themself within the field of view of the local camera and within detection range of the microphone. The respective image and audio streams are communicated to the video communication session for presentation by one or more second electronic devices. Recent trends are for increased use of video communications in a wide range of settings, including homes and public spaces.

Video communication sessions are increasing used for academic instruction and training to replace the traditional live or in-person sessions. With traditional in-person meetings/sessions, the host, such as a teacher or employer, can readily determine who attends the session and who is paying attention during the session. However, in a large video communication session, it is difficult and/or impossible for a host to monitor a gallery of video feeds from each participant to manually manage attendance, participation, and compliance with policies applicable the online participants. Training may be unsuccessful at least in part due to failure to track and enforce proper participation and conduct during a one-way (playback) or two-way (live) video communication session.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 8A-8B (collectively FIG. 8) depict a flow diagram of a method for automatically creating quizzes based on recent speech or written content presented to a participant to assess participant attentiveness, according to one or more embodiments.

DETAILED DESCRIPTION

Figure 1:
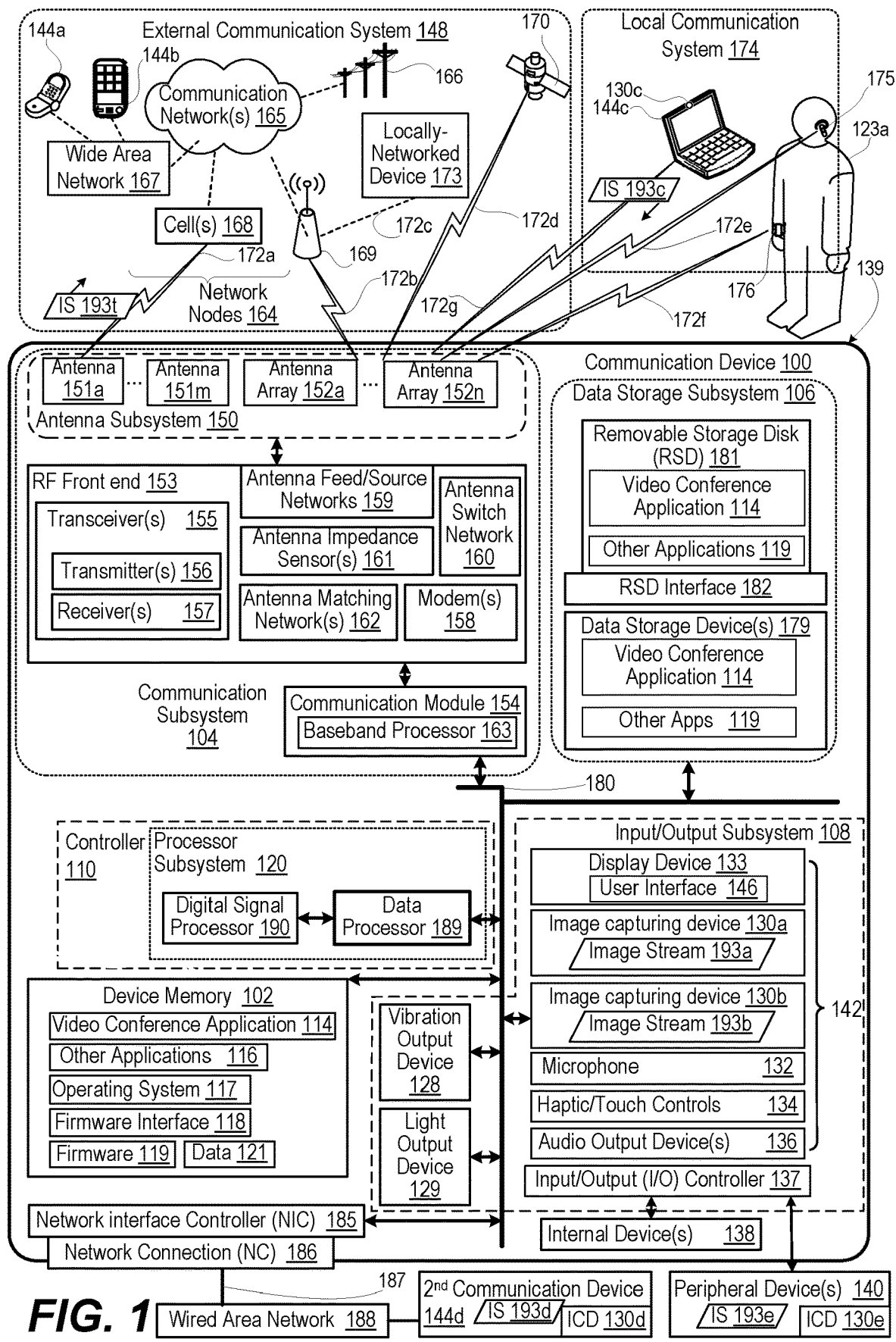
FIG. 1 depicts a functional block diagram of a communication environment including a communication device having components that automatically manage compliance by a participant during a video communication session, and within which the features of the present disclosure are advantageously implemented, according to one or more embodiments.

According to a first aspect of the present disclosure, an electronic device, a computer program product, and a method are provided that automatically manages compliance by a participant during a video communication session. The electronic device includes at least one network interface that communicatively connects the electronic device over a network to one or more second electronic devices during a video communication session. A controller of the electronic device is communicatively coupled to the at least one network interface. The controller receives at least one image stream. Each image stream is produced respectively by an image capturing device of a corresponding second electronic device. The controller identifies at least one person within the at least one image stream. The controller produces attendance data by comparing the at least one person that is identified with a roster of at least one person expected to join the video communication session. The controller determines participation data related to an amount of time that the at least one person is gazing toward the image capturing device of the corresponding second electronic device. The controller communicates, to a host output device, the attendance data and the participation data of the at least one person during the video communication session.

According to one aspect, managing compliance by a participant includes reporting on whether a participant is paying attention to the video communication session. In one or more embodiments, attentiveness may be based on an amount of time that the participant gazes toward a display device that is presenting visual content for the video communication session. In one or more embodiments, compliance can include the participant wearing proper garments and attire, use of required articles by the participant, and establishing or being in an environment conducive to receiving instruction and training.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, within an operating environment and within which several of the features of the present disclosure are advantageously implemented. Referring now to the specific component makeup and the associated functionality of communication device 100. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as video conference application 114, and other application(s) 116. Device memory 102 further includes operating system (OS) 117, firmware interface 118, such as basic input/output system (BIOS) or Uniform Extensible Firmware Interface (UEFI), and firmware 119.

Controller 110 includes processor subsystem 120 that executes program code to provide operating functionality of communication device 100 that automatically detects compliance by visually identifying objects in an image stream and generates alerts in response to noncompliance. The software and/or firmware modules have varying functionality when their corresponding program code is executed by processor subsystem 120 or secondary processing devices within communication device 100. Processor subsystem 120 of controller 110 can execute program code of video conference application 114, and other applications 116 to configure communication device 100 to perform specific functions. Device memory 102 can include data 121 used by the applications.

I/O subsystem 108 includes user interface components such as vibration output device 128, light output device 129, image capturing devices 130a-130b, microphone 132, display device 133, touch/haptic controls 134, and audio output device(s) 136. In an example, image capturing devices 130a-130b are front and back cameras. In another example, image capturing devices 130a-130b are on the same side but have different lenses such as two different ones of telephoto, wide angle, macro, or general purpose lenses. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to image capturing devices 130a-130b and to at least one user interface device 142, such as at least one microphone 132. Image capturing device 130a and user interface device 142 allows a participant using communication device 100 to be an active participant in a video communication session with a second participant using a corresponding one of second communication device 144a-144d that can be similarly configured and/or provide similar functionality as communication device 100. Controller 110 is also communicatively coupled to at least one display device 133 that presents user interface 146 for the video communication session. Controller 110 executes video conference application 114 stored in device memory 102 to configure communication device 100 to enable communication with second communication device(s) 144a-144d in the video communication session. It is appreciated that second communication device 144a-144d can be identically or similarly equipped with components and functionality described for communication device 100. According to aspects of the present disclosure, communication device 100 can be communicatively coupled to one or more of image capturing devices ("ICC") 130c-130e respectively provided for example by communication devices 144c/144d and peripheral device 140.

Each of communication device 100 and second communication devices 144a-144d can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 148. Communication sub system 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 using by antenna subsystem 150. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100 and second communication devices 144a/144b. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176 such as used by person 123a. In one or more particular embodiments, communication subsystem 104 communicates with second communication device(s) 144c via wireless link 172g to form an ad hoc network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as video conference application 114 and other application(s) 116 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for video conference application 114 and other application(s) 116.

In one or more embodiments, I/O subsystem 108 includes network interface controller (NIC or "network interface") 185 with a network connection (NC) 186 on housing 139. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN). For example, NC 186 can be an Ethernet connection. Second communication devices 144d is communicatively coupled to wired area network 188. In one or more embodiments, second communication devices 144d includes image capturing device (ICD) 130d that produces image stream 193d.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 120, which includes one or more central processing units (CPUs), depicted as data processor 189. Processor subsystem 120 can include one or more digital signal processors 190 that are integrated with data processor 189. Processor subsystem 120 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

According to one aspect, communication device 100 can function as a content-discerning "transmitting device" that operates as a host or presenter, providing one of image streams 193a-193d to communicate to one or more second communication devices 144a-144b that function as "receiving device(s)" for remote participants. The multiple image streams 193a-193d can originate from different image capturing devices. In an example, image capturing devices 130a-130b of communication device 100 can provide multiple image streams 193a-193b, respectively. In another example, at least one of second communication devices 144c-144d is available locally to communication device 100 to provide a respective image streams 193c-193d to controller 110. In an additional example, peripheral device 140 has image capturing device 130e that provides image stream 193e to controller 110. Controller 110 configures communication device 100 and the communicatively connected one or more second communication devices 144c-144e and peripheral device 140 to perform functionality described herein by visually identifying/determining compliance by participant 123 captured in one image stream 193a-193e. Image stream 193a-193e may be local or remote to communication device 100. According to one embodiment, controller 110 executes video conference application 114, stored in a computer readable medium such as device memory 102, to visually detect compliance with policies by participant 123 using communication device 100 or one of second communication devices 144a-144d. In one or more embodiments, compliance is defined using a visual metric that has a positive correlation with a desired objective. In an example, having eye gaze toward content visually presented to a person is an incomplete metric for comprehension and engagement. A person may absorb content quickly with less gazing toward displayed content. A person may focus on verbal content during portions of the video communication session with eye gaze being a less effective metric for measuring active listening. Conversely, a person may stare intently at displayed content yet be daydreaming or otherwise mentally inattentive to the visually presented content.

Compliance can thus be measuring a physical attribute or characteristic that correlates, but does not equate, to attentiveness, participation, engagement, and/or comprehension.

Figure 2:
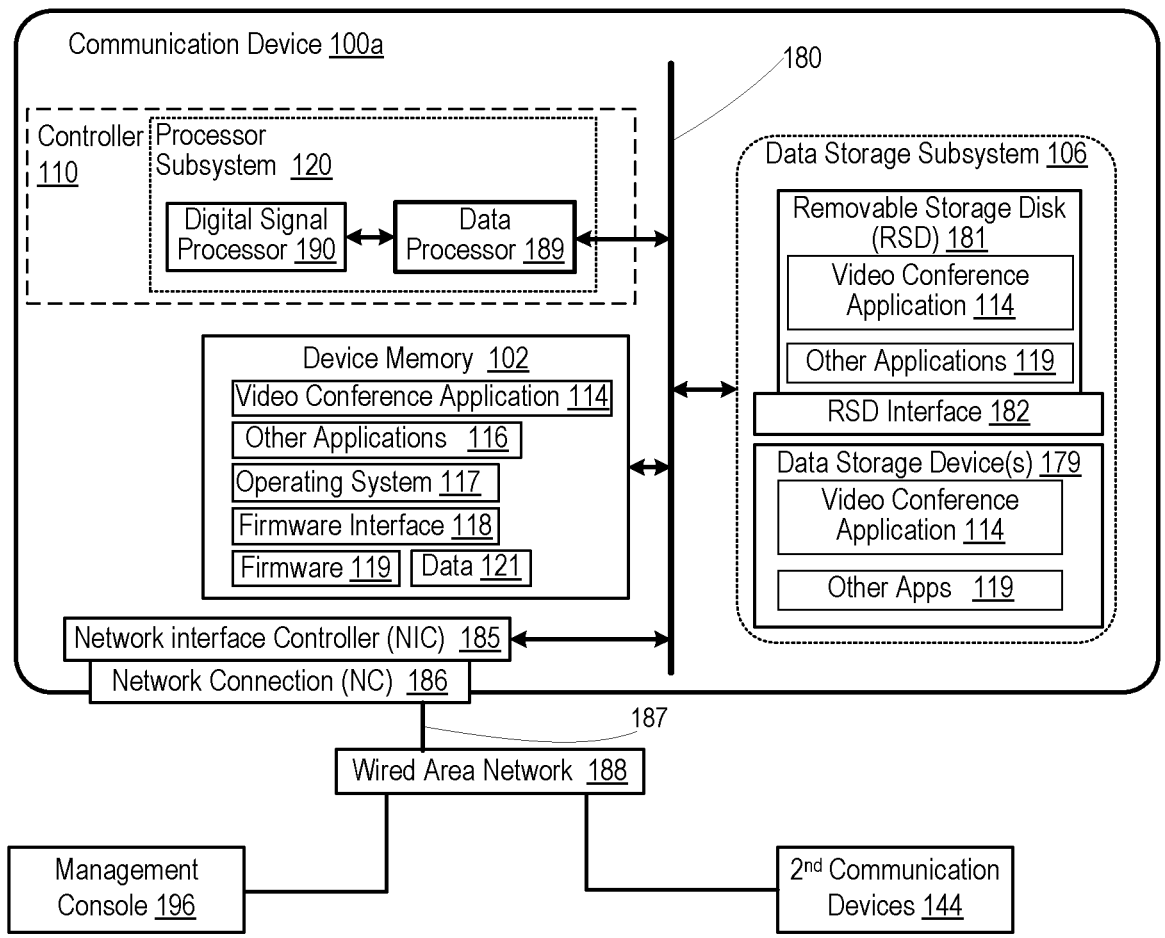
FIG. 2 depicts a functional block diagram of a network communication device that facilitates a video communication session and automatically manages compliance by a participant, according to one or more embodiments.

FIG. 2 depicts a functional block diagram of a wired communication environment including communication device 100a having network server component that facilitates a video communication session and automatically manages compliance by a participant, and within which the features of the present disclosure are advantageously implemented. In one or more embodiments, communication device 100a can have similar or identical components to communication device 100 with certain components unused or removed to enable communication device 100a to function as a network server. In one or more embodiment, communication device 100a is purpose assembled as a network server having controller 110 that manages device memory 102, data storage subsystem 106, and NIC 185. Management console 196 can periodically communicatively connect to communication device 100a via wired area network 188 to configure program code such as video conference application 114 and data 121. Controller 110 executes video conference application 114 to configure communication device 100a to (i) facilitate one or more communication sessions for second communication devices 144 and (ii) monitor compliance.

Figure 3:
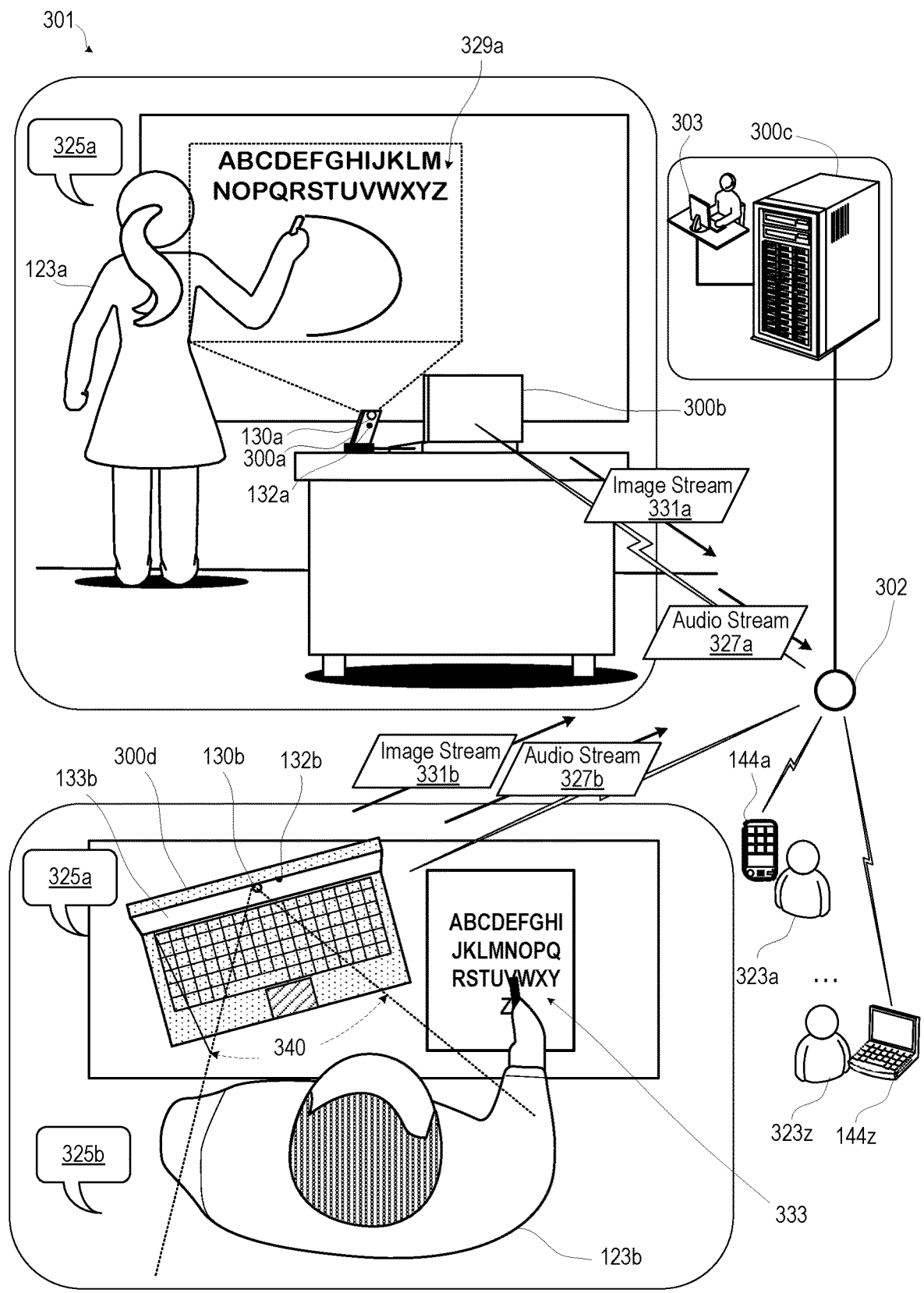
FIG. 3 depicts a communication environment of host/teacher communication device, network communication device, and participant communication device during a video communication session, according to one or more embodiments.

FIG. 3 depicts communication environment 301 that manages compliance during a video communication session conducted across network 302. For clarity, network 302 is depicted a single node but may be a combination of wired and wireless connections as described in the above description of FIG. 1. Communication environment 301 includes host/teacher communication devices 300a-300b used by first person 123a that may have similar or identical components and functionality as described for communication device 100 (FIG. 1). Communication device 300a is depicted as a smartphone. Communication device 300b is depicted as a laptop. Network communication device 300c is generally autonomous but can be controlled by management console 303 on occasion to make configuration changes. Network communication device 300c may have similar identical components and functionality of communication device 100a (FIG. 2). Participant communication device 300d is operated by second person 123b. In one or more embodiments, additional second communication devices 144a-144z are connected via network 302 to the video communication session and are operated by corresponding participants 323a-323z. First person 123a is creating speech 325a that is captured by microphone 132a of host/teacher communication device 300a and communicated as audio stream 327a to the video communication session. First person 123a is creating written content 329a that is captured by image capturing device 130a of host/teacher communication device 300a and communicated as image stream 331a to the video communication session. Participant communication device 300d presents audio 327a and image stream 331a for second person 123b. Microphone 132b of participant communication device 300d captures speech 325b by second person 123b as audio stream 327b that may be communicated to the video communication session, if microphone 132b is not muted at participant communication device 300d. Image capturing device 130b of participant communication device 300d has a field of view (FOV) 340 that captures image stream 331b, which incorporates all or a portion of second person 123b. Participant communication device 300d may communicate image stream 331b to the video communication session if image capturing device is not disabled (i.e., turned off) at participant communication device 300d. It is appreciated that, even if audio stream 327b and image stream 331b are received by host/teacher communication devices 300a-300b, host/teacher communication devices 300a-300b may not present audio stream 327b and image stream 331b to first person 123a. In addition, first person 123a may be occupied with presenting instructional content and unable to monitor attentiveness and/or compliance by second person 123b.

Compliance can, in part, be based on an amount of time that second person 123b is gazing at display device 133b of participant communication device 300d. Image capturing device 130b is physically located on a same side as display device 130b and can capture image stream in which the gaze of second person 123b would be discernible. In an example, a gaze compliance threshold for attentiveness can be established, requiring second person 123b to gaze toward participant communication device 300d at least 60% of the time during a one-minute period of time in order for second person 123b to receive a passing score for satisfactory attentiveness. Participation score can be calculated, at least in part, on the gaze time of the participant. The gaze compliance threshold is set to be less than 100% to accommodate additional activities that may be allowable or preferred by second person 123b, such as taking notes 333, looking away periodically to reduce eye strain, and active listening when audio stream 327a is conveying the instructional content rather than viewing a static (less instructional-based) image stream 331a.

In alternate embodiments, one or more of host/teacher communication devices 300a-300b, network communication device 300c, and participant communication device 300d can perform the functionality of managing compliance by second person 123b. As an example, in one embodiment, so as to reduce transmission and computational overhead for host/teacher communication devices 300a-300b and network communication device 300c, participant communication device 300d can monitor image stream 331b from image capturing device 130b and report compliance to host/teacher communication devices 300a-300b and network communication device 300c. In one or more alternate embodiments, one or more of host/teacher communication devices 300a-300b and network communication device 300c receive image stream 331b and manage compliance, which also enables use of participant communication device 300d that is not specifically configured for compliance management.

Figure 4:
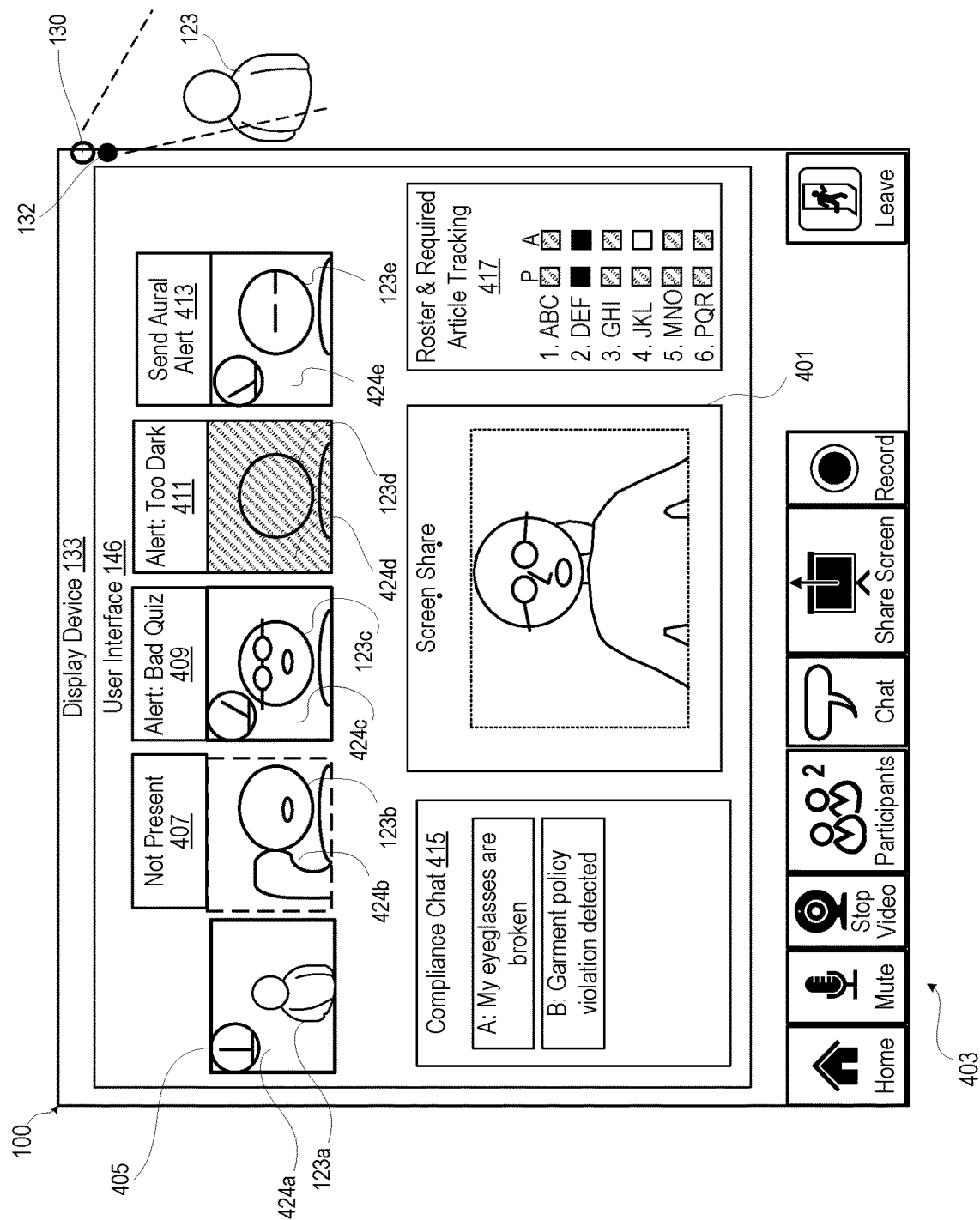
FIG. 4 depicts user interface presented compliance alerts on a display device of a communication device during the video communication session, according to one or more embodiments.

FIG. 4 depicts an embodiment of user interface 146, which presents compliance alerts on display device 133 of communication device 100 during the video communication session. First person 123, associated with or operating communication device 100, can be positioned within detection range of image capturing device 130 and microphone 132 to enable communication device 100 to produce an audiovisual stream 401 that is communicated to second communication devices 144a-144b (FIG. 1). User interface 146 provides general video communication session controls 403 such as "home" for settings, audio mute/unmute toggle, stop/start video toggle, view mode toggle, chat window selection, share screen toggle, record start/stop control, and video communication session join/leave toggle. In one or more embodiments, compliance level is presented by including dynamic participation gauge 405 superimposed within or placed adjacent to each participant image stream 424a-424e. Automatic alerts may be presented with the applicable participant image stream 424a-424e, including alerts such as: "not present" alert 407, "failed participation quiz" alert 409, "too dark" alert 411, and "send aural" alert 413, which is triggered or activated in response to detecting a sleeping participant. Participants who wish to provide an explanation for a detected compliance failure can provide a written explanation that is captured, such as in a private compliance chat window 415. Scores and other compliance data can be captured and presented in a "roster and required article" tracking window 417.

In one or more embodiments, communication device 100 is configured to exclusively present user interface 146, preventing use of other applications that obscure video or audio during a video communication session. In an example, communication device 100 may prevent execution of other applications 116 (FIG. 1) that cause presentation of audio/video content on an output device communicatively connected to communication device 100. In one or more embodiments, communication device 100 may be configured to report execution of other applications 116 (FIG. 1) to a host or network communication device. In an example, video conference application 114 (FIG. 1) configures communication device to monitor what is presented at display device 133 and to monitor what is presented at audio output from audio output device(s) 136. By comparing the received image stream and audio stream from the video communication session to what is locally presented, communication device 100 detects that one or more other applications 114 (FIG. 1) are presenting content that interferes with the video communication session.

Figure 6:
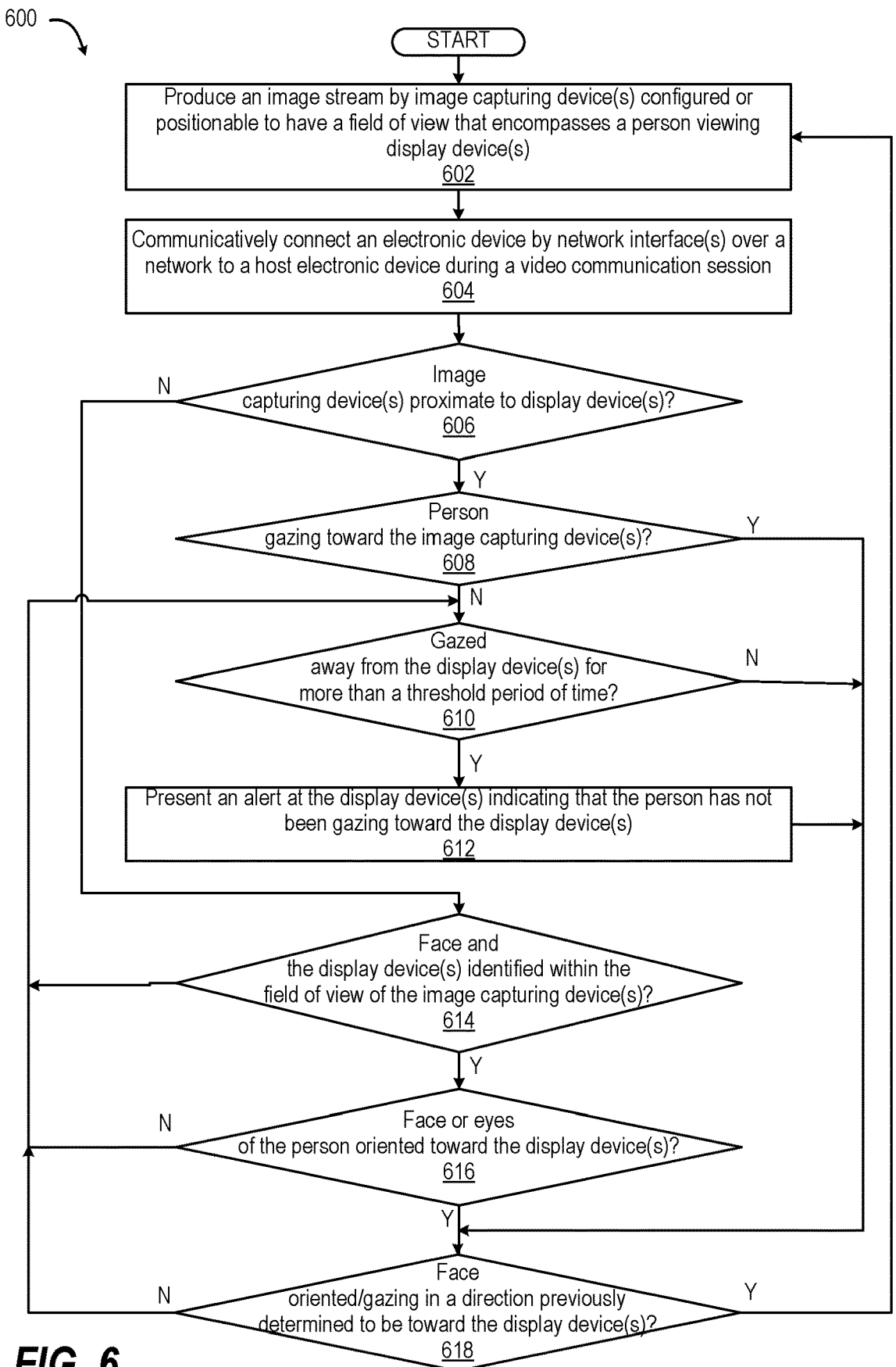
FIG. 6 depicts a flow diagram of a method for managing compliance based on gaze direction of a participant who uses a communication device, according to one or more embodiments.
Figure 7A:
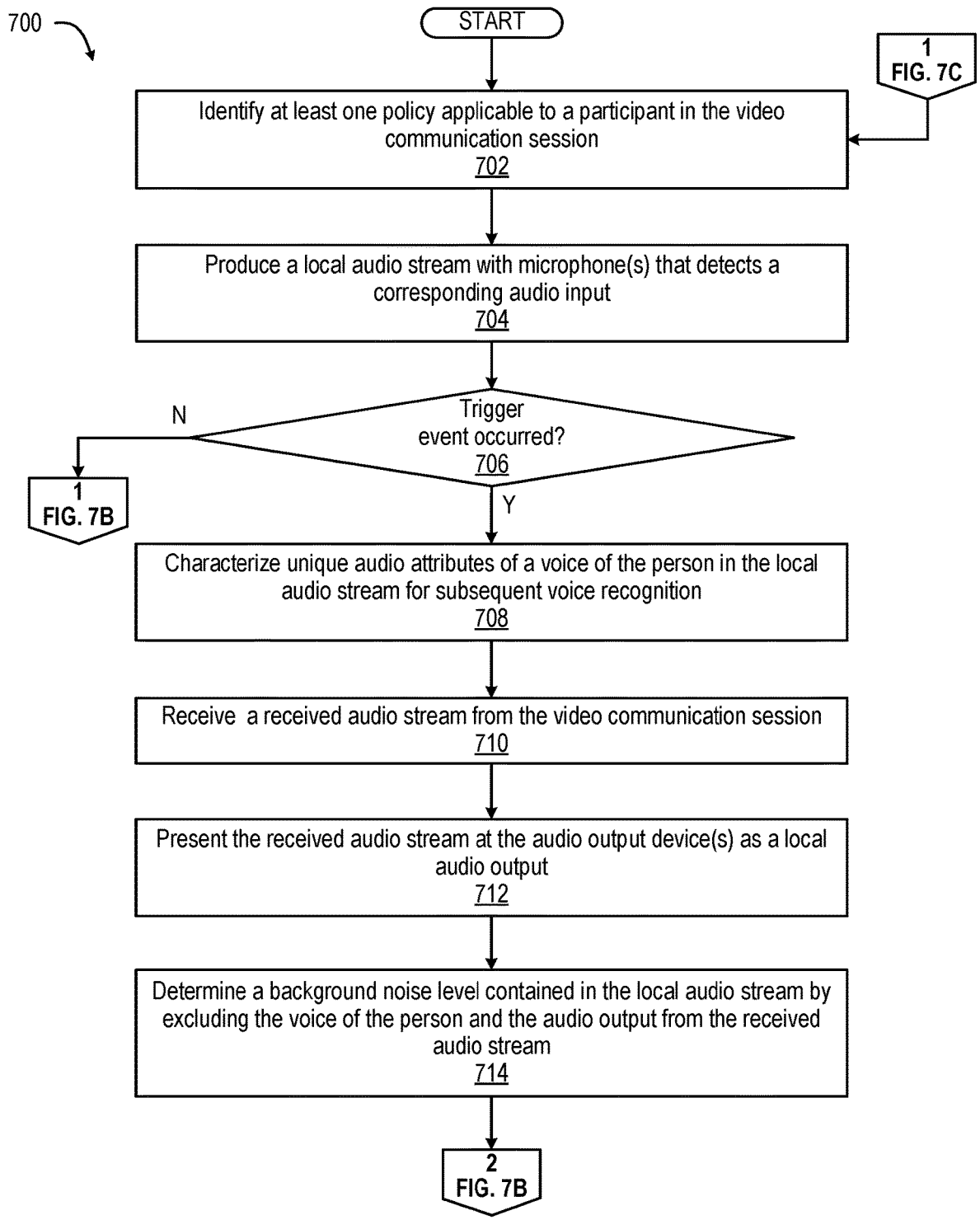
FIGS. 7A-7C (collectively FIG. 7) depict a flow diagram of a method for managing compliance with a policy requiring limited background noise, live image stream, completion of a visual acuity test, and adequate illumination of a participant who uses a communication device, according to one or more embodiments.
Figure 7B:
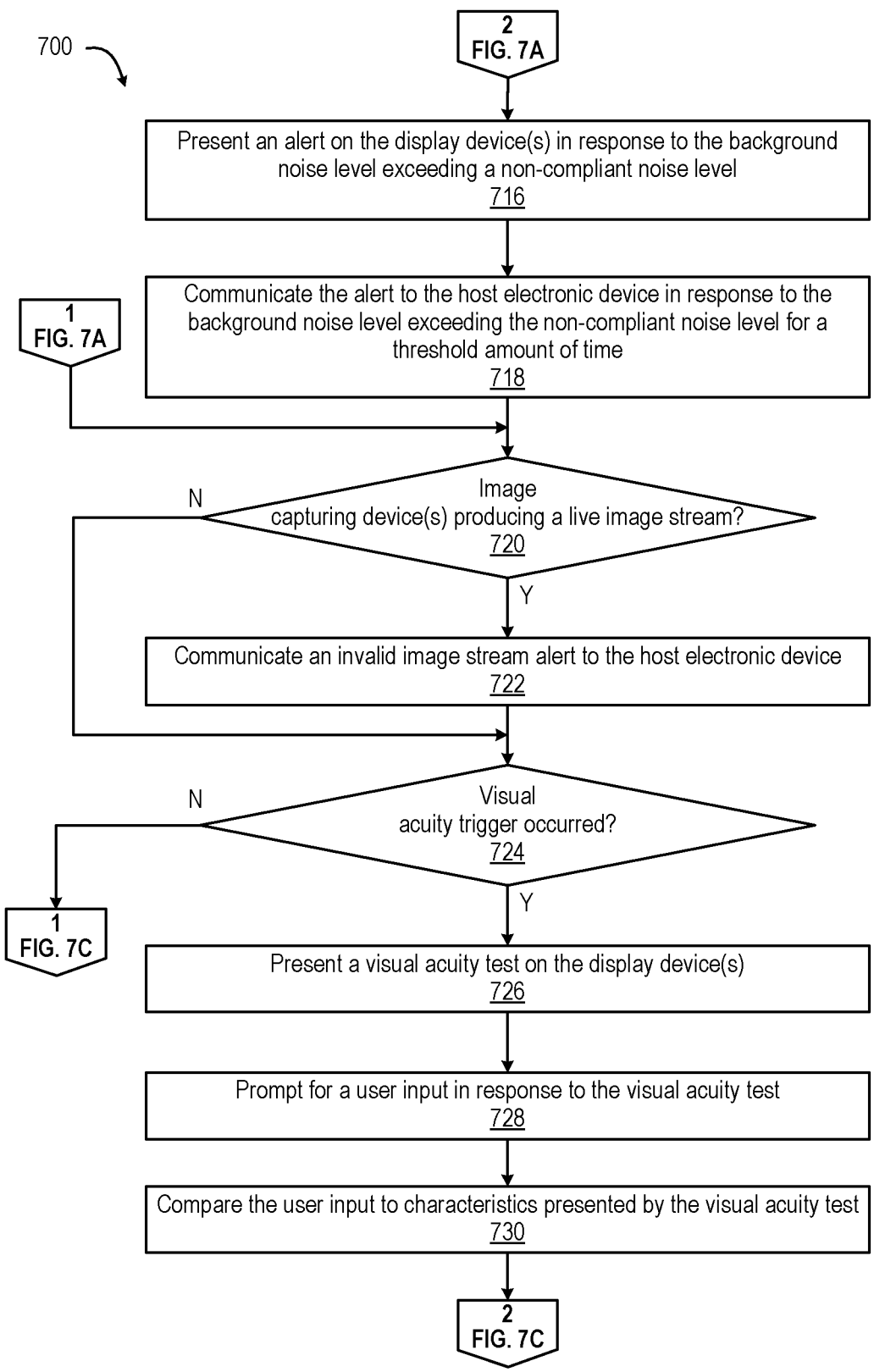

With reference now to the flow charts, there are presented method 500 (FIGS. 5A-5C), method 600 (FIG. 6) and method 700 (FIGS. 7A-7B). Method 500 depicted in FIGS. 5A-5C (collectively FIG. 5) describe examples of functionality performed by communication device 100 used by person 123 (FIG. 1) or by communication device 100a (FIG. 2) that supports a video communication session. The functionality includes managing compliance of person 123b who uses communication device 300d (FIG. 3). In an example of compliance management, method 600 depicted in FIG. 6 provides for managing compliance with a policy requiring attentiveness as defined by gaze direction of person 123b who uses communication device 300d (FIG. 3). In another example of compliance, method 700 depicted in FIGS. 7A-7C (collectively FIG. 7) provides for managing compliance with a policy requiring limited background noise, live image stream, completion of a visual acuity test, and adequate illumination of person 123b who uses communication device 300d (FIG. 3). Method 800 depicted in FIGS. 8A-8B (collectively FIG. 8) depict a flow diagram of a method for managing compliance and/or assess attentiveness of person 123b who uses communication device 300d (FIG. 3) by automatically creating quizzes based on recent speech or written content presented by person 123a. The descriptions of methods 500, 600, 700 and 800 are provided with general reference to the specific components illustrated within the preceding FIGS. 1-4, and specific components referenced in methods 500, 600, 700 and 800 may be identical or similar to components of the same name used in describing preceding FIGS. 1-4.

Figure 5A:
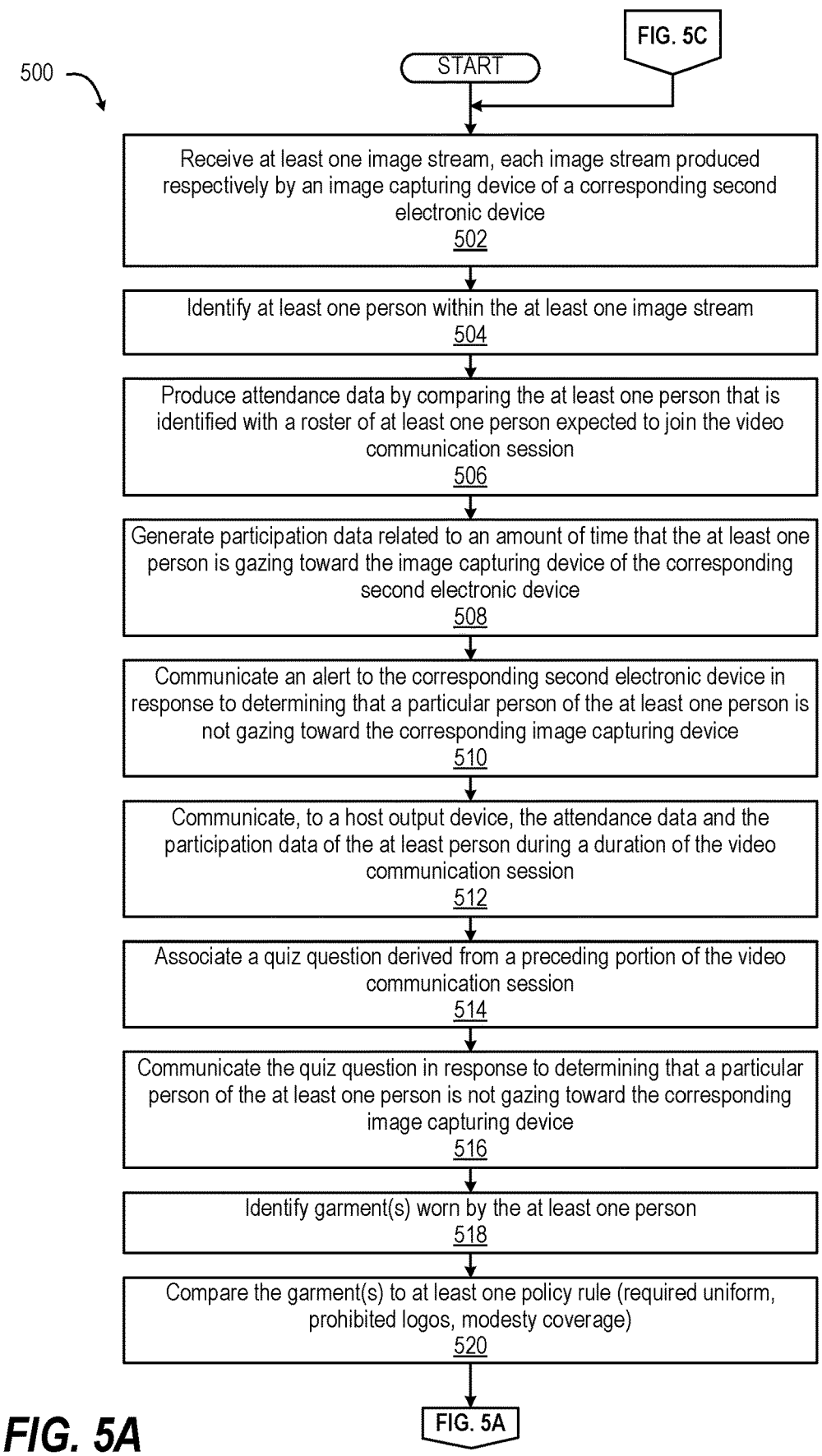
FIGS. 5A-5C (collectively FIG. 5) depict a flow diagram of a method performed by a host or network communication device for managing compliance of a participant using a second communication device during a video communication session, according to one or more embodiments.

With reference to FIG. 5A, method 500 includes receiving, by an electronic device, via at least one network interface and network, during a video communication session, at least one image stream (block 502). Each image stream received is produced respectively by an image capturing device of a corresponding second electronic device. Method 500 includes identifying at least one person within the at least one image stream (block 504). Method 500 includes producing attendance data by comparing the at least one person that is identified within the image stream with a roster of at least one person expected to join the video communication session (block 506). Method 500 includes generating participation data co-related to an amount of time that the at least one person is gazing toward the image capturing device of the corresponding second electronic device (block 508). Method 500 includes communicating an alert to the corresponding second electronic device in response to determining that a particular person of the at least one person is not gazing toward the corresponding image capturing device (block 510). In one or more embodiments, the alert is not triggered until the person gazes away for a period of time that exceeds a threshold amount. Compliance does not require constant staring at the display screen. Empirical data for optimum behaviors and/or real-time monitoring of user behavior may be used to set thresholds and time periods. Method 500 includes communicating, to a host output device, the attendance data and the participation data of the at least person during a duration of the video communication session (block 512). Participation data can include attentiveness as related to a score on gazing toward visual content. Participation data can include amount of verbal or text responses made. Participation data can include compliance with policies that avoid a distraction for other persons using second communication devices that are connected to the video communication session. In one or more embodiments, the alerts are made frequently enough, directly to the person, for the person to renew looking at a display device before noncompliance is reported to a host or network communication device. In an example, a local alert is based on a measuring eye gaze direction over a relatively short pre-defined period of time. A relatively high threshold is set for satisfactory participation with a local alert being presented for falling short of the threshold. By contrast, participation data may be based on a longer time period than the local alerts and have a lower threshold for a satisfactory amount of participation, such as co-related to eye gaze direction. Responding promptly to the local alerts may in most instances avoid an unsatisfactory participation score.

Following block 512, method 500 includes associating a quiz question derived from a preceding portion of the video communication session (block 514). Method 500 includes communicating the quiz question in response to determining that a particular person of the at least one person is not gazing toward the corresponding image capturing device (block 516). In one or more embodiments, correctly answering a question raises a participation score. In one or more embodiments, correctly answering a question adds a mitigating comment to the participation data. In one or more embodiments, one of communication devices 300a-300c generates, stores and communicates participation data for each person 123b (FIG. 3). In one or more embodiments, each communication device 300d generates, stores and communicates participation data specific to corresponding person 123b who is using communication device 300d (FIG. 3). One or more of communication devices 300a-300c receives, aggregates, stores and redistributes the separately collected participation data. In one or more embodiments, the participation data characterizes behavior over an entire video communication session. In one or more embodiments, the participation data characterizes behavior of segmented time period of the video communication session.

Method 500 includes identifying, from the image stream, garment(s) worn by the at least one person (block 518). Method 500 includes comparing the garment(s) to at least one clothing policy rule (e.g., required uniform, prohibited logos, modesty coverage) (block 520). Method 500 continues at decision block 522 of FIG. 5B.

Figure 5B:
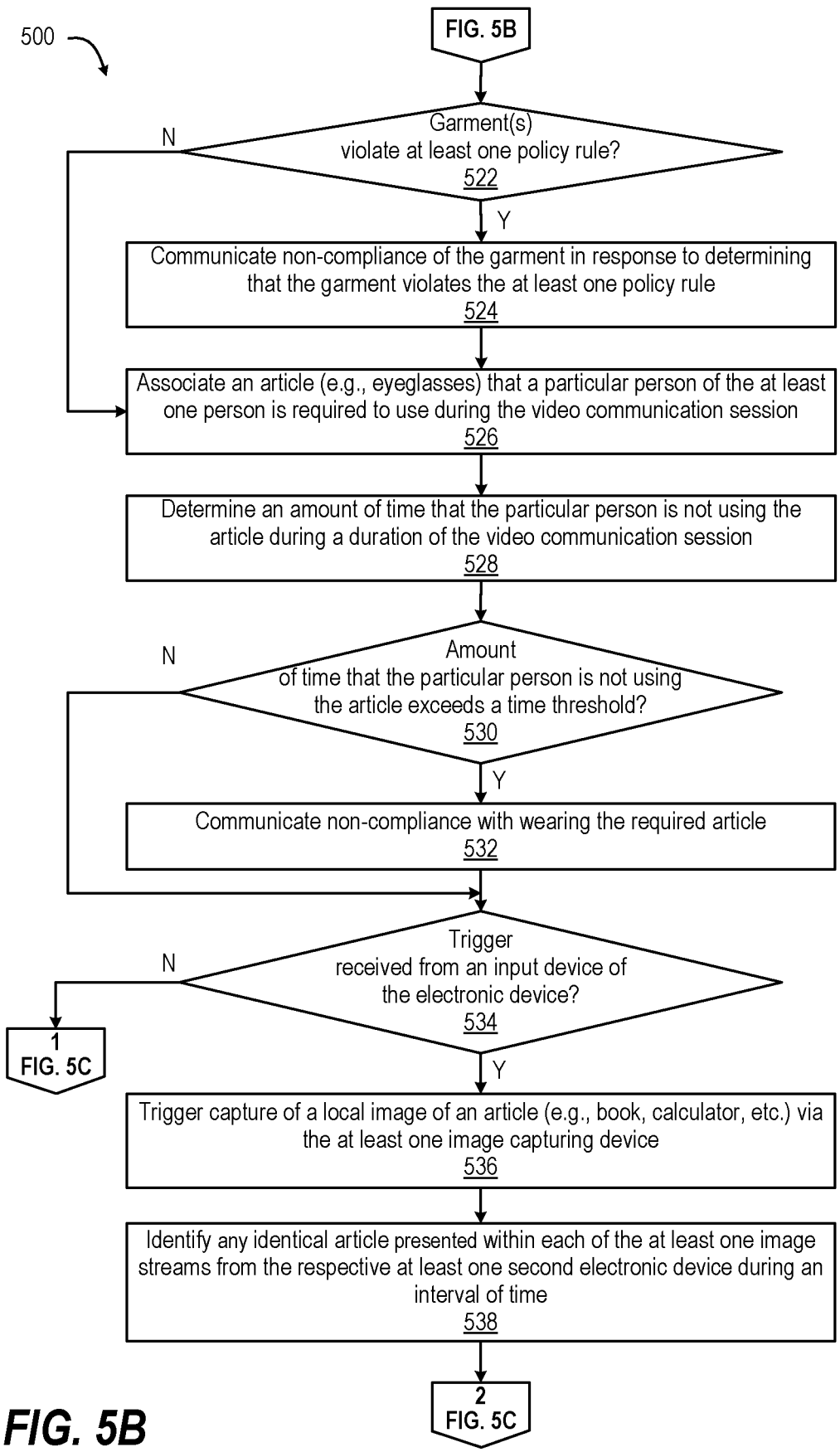

With reference to FIG. 5B, method 500 includes determining whether the garment(s) worn violate at least one clothing policy rule (decision block 522). In response to determining that the garment does not violate at least one clothing policy rule, method 500 proceeds to block 526. In response to determining that the garment violates the at least one clothing policy rule, method 500 includes communicating non-compliance of the garment to the corresponding person (block 524).

Proceeding from one of decision block 522 or block 524, method 500 includes associating or identifying an article (e.g., eyeglasses) that a particular person of the at least one person is required to use during the video communication session (block 526). Method 500 includes determining an amount of time that the particular person is not using the article during a duration of the video communication session (block 528). Method 500 includes determining whether the amount of time that the particular person is not using the article exceeds a time threshold (decision block 530). In response to determining that the amount of time that the particular person is not using the article does not exceed a time threshold, method 500 proceeds to decision block 534. In response to determining that the amount of time that the particular person is not using the article exceeds a time threshold, method 500 includes communicating non-compliance with wearing the required article (block 532).

Figure 5C:
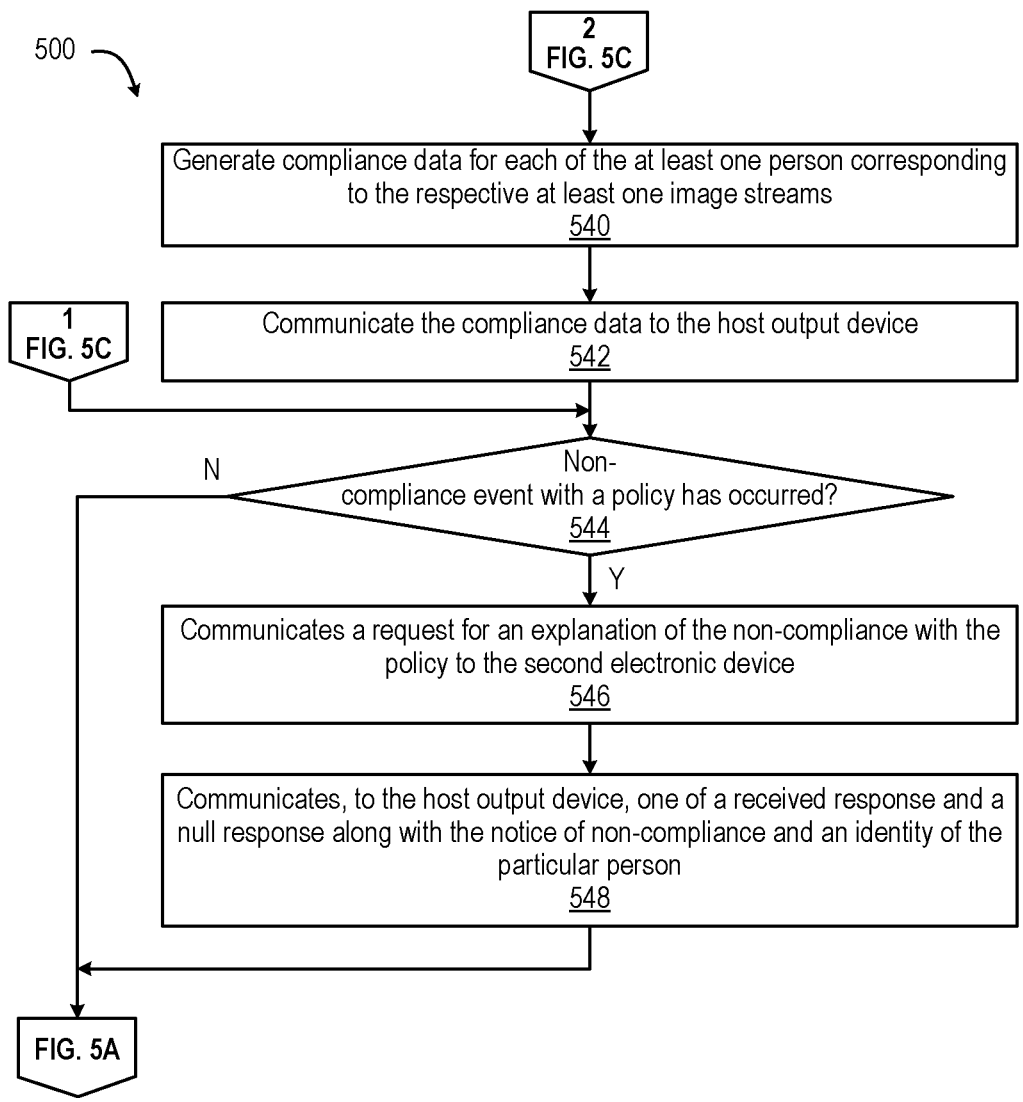

Proceeding from one of decision block 530 or block 532, method 500 includes determining whether a trigger is received from an input device of the electronic device (decision block 534). In an example, a host person or teacher holds up a required textbook and says, "please hold up your textbook". The controller identifies the image of the textbook and recognizes the statement by the host person as a trigger. In another example, the host person or teacher selects a user interface control to confirm participation use of a "calculator". The controller recognizes the user input as a trigger and accesses an image library of what calculators look like. In response to determining that the trigger is not received from the input device, method 500 proceeds to decision block 544 (FIG. 5C). In response to determining that the trigger is received from the input device, method 500 includes triggering capture of a local image of an article (e.g., book, calculator, etc.) via the at least one image capturing device (block 536). Method 500 includes, during an interval of time, identifying any identical article presented within each of the at least one image streams from the respective at least one second electronic device during the interval of time (block 538). Then method 500 proceeds to block 540 (FIG. 5C).

With reference to FIG. 5C, method 500 includes generating compliance data for each of the at least one person corresponding to the respective at least one image streams (block 540). Depending on the respective degree of compliance, each person can have compliance data that is relatively negative, neutral, positive, or a mix of characterizations. In one or more embodiments, compliance data that is negative can be reported in order to expedite review and response by a recipient. Method 500 includes communicating the compliance data to the host output device (block 542). After decision block 534 or block 542, method 500 includes determining whether a non-compliance event has occurred with a policy, by a particular person of the at least one person during the video communication session (decision block 544). In response to determining that a non-compliance event with a policy has not occurred during the video communication session, method 500 returns to block 502 (FIG. 5A). In response to determining that a non-compliance event with a policy has occurred, method 500 includes communicating a request for an explanation of the non-compliance with the policy to the second electronic device (block 546). Method 500 includes communicating, to the host output device, one of a received response and a null response along with the notice of non-compliance and an identity of the particular person (block 548). Then method 500 returns to block 502 (FIG. 5A).

In one or more embodiments, method 500 includes receiving a host audio stream incorporating speech from a host participant, the host audio stream communicated to the one or more second electronic devices for presentation to a corresponding one or more person. Method 500 includes receiving a host image stream incorporating written content by the host participant, the host image stream communicated to the one or more second electronic devices for presentation to the corresponding one or more person. Method 500 include constructing a quiz question that includes at least one of: (i) a correct answer extracted from at least one of the speech and the written content and (ii) at least one incorrect answer that is not extracted from at least one of the speech and the written content. Method 500 includes communicating the quiz question to at least one of the one or more second electronic devices to prompt for a response by a corresponding user of the at least one of the one or more second electronic devices. Method 500 includes determining accuracy of one of: (i) a response; and (ii) a null response from a particular second electronic device. Method 500 includes determining the participation data in part based on the accuracy of the response for a corresponding person associated with the particular second electronic device.

In one or more embodiments, method 500 includes identifying at least one garment within the at least one image stream from a particular second electronic device. Method 500 includes identifying compliance of the at least one garment with a clothing policy from among policy directives. Method 500 includes communicating non-compliance data to the host output device for a person corresponding to the particular second electronic device based on determining that the at least one garment violates the clothing policy. In one or more particular embodiments, method 500 includes identifying compliance of the at least one garment with a clothing policy selected from among the policy directives comprising one or more of: (i) modesty; (ii) required uniform garment; and (iii) presence of a supportive logo.

In one or more embodiments, in response to identifying one of: (i) a trigger received from a host user interface; and (ii) participation data below a threshold, method 500 includes communicating a visual acuity test to a particular second electronic device. The visual acuity test is conducted to measure how clearly the person can see from a distance and to determine whether corrective glasses are needed. A Snellen chart is presented with letters that get progressively smaller on lower rows. Method 500 includes receiving a user input to the visual acuity test from the particular second electronic device. Method 500 includes comparing the user input to characteristics presented by the visual acuity test. Method 500 includes communicating a failed test alert to the host electronic device in response to the user input not matching the characteristics presented by the visual acuity test.

In one or more embodiments, method 500 includes determining an illumination level of the image stream. Method 500 includes presenting an illumination level alert at the at least one display device in response to determining that the illumination level is less than a threshold illumination level. Proper illumination may support effective visual monitoring of the participant. Proper illumination may also enhance the attentiveness of the participation. Proper illumination can avoid eye strain or other effects of looking at a bright display in a darkened room.

In one or more embodiments, method 500 includes identifying an article that a particular person of the at least one person is required to use during the video communication session. Method 500 includes determining an amount of time that the particular person is not using the article during a duration of the video communication session. Method 500 includes communicating non-compliance in response to determining that the amount of time that the particular person is not using the article exceeds a time threshold.

In one or more embodiments, method 500 includes determining, during the video communication session, incidents of non-compliance by a particular person with a policy associated with one of: (i) participation score; (ii) use of a required article; and (iii) wearing of permitted garments. In response to determining non-compliance by the particular person with the policy during the video communication session, method 500 includes communicating a notice of the non-compliance with the policy to a corresponding second electronic device of the particular person. Method 500 includes communicating a request for an explanation of the non-compliance with the policy to the second electronic device. Method 500 includes communicating, to the host output device, one of a received response and a null response along with the notice of non-compliance and an identity of the particular person. A null response includes a blank response affirmatively sent from the particular second electronic device. A null response includes no response within a particular period of time that indicates the participant refuses to respond or has become unavailable to respond. The null response may be deemed as an incorrect answer. In one or more embodiments, the particular type of null response is tracked and reported.

In one or more embodiments, in response to a trigger from the input device, method 500 includes triggering capture of a local image of an article via the at least one image capturing device. Method 500 includes identifying whether an identical article is identified within each of the at least one image streams from the respective at least one second electronic device. Method 500 includes generating compliance data comprising one of compliant and non-compliant for each of the at least one person corresponding to the respective at least one image streams. Method 500 includes communicating the compliance data to the host output device.

FIG. 6 depicts a flow diagram of method 600 for managing compliance of person 123b who uses communication device 300d (FIG. 3). Method 600 includes producing an image stream by image capturing device(s) configured or positionable to have a field of view that encompasses a person viewing display device(s) (block 602). Method 600 includes communicatively connecting an electronic device by network interface(s) over a network to a host electronic device during a video communication session (block 604). During the video communication session, method 600 includes identifying (by using one or more techniques described below) whether the person is gazing toward the display device(s). In one or more embodiments, method 600 includes determining whether the image capturing device(s) is proximate to the display device(s) (decision block 606). In response to determining that the image capturing device(s) is not proximate to the display device(s), method 600 proceeds to decision block 614. In response to determining that the image capturing device(s) is proximate to the display device(s), method 600 includes identifying whether the person is gazing toward the display device(s) by determining whether the person is gazing toward the image capturing device(s) (decision block 608). In response to determining that the person is gazing toward the display device(s), method 600 proceeds to block 602. In response to determining that the person is not gazing toward the image capturing device(s), method 600 includes determining whether the person has gazed away from the display device(s) for more than a threshold period of time (decision block 610). In response to determining that the person has not been gazing away from the display device(s) for not more than (i.e., less than or equal to) a threshold period of time, method 600 proceeds to block 602. In response to determining that the person has been gazing away from the display device(s) for more than a threshold period of time, method 600 includes presenting an alert at the display device(s) indicating that the person has not been gazing toward the display device(s) (block 612). In one or more embodiments, the alert includes one or more of a visual alert, an auditory alert, and a vibratory alert. Method 600 proceeds to block 602.

In response to determining that the image capturing device(s) is not proximate to the display device(s) in decision block 606, method 600 includes identifying a gaze direction that is not toward the image capturing device(s) but is toward the display device(s). In particular, during the video communication session, method 600 includes identifying whether the person is gazing toward the display device(s) by determining a particular gaze direction by one or more techniques. In one or more embodiments, method 600 includes determining whether the face of the person and the display device(s) are identified within the field of view of the image capturing device(s) (decision block 614). In response to determining that the face of the person and the display device(s) are not identified within the field of view of the image capturing device(s), method 600 proceeds to decision block 618. In response to determining that the face of the person and the display device(s) are identified within the field of view of the image capturing device(s), method 600 includes determining whether at least one of the face and the eyes of the person are oriented toward the display device(s) (decision block 616). In one or more embodiments, the controller identifies whether the head of the person is directed toward, away from, to the left of, or to the right of the image capturing device. The controller determines whether the display device(s) are positioned in that relative direction to the person. In one or more embodiments, the controller has three-dimensional data based on range finding, triangulation of multiple display devices, three-dimensional image stream, etc. The controller can determine the locations of the person and the display device(s) in three-dimensional space. The controller may use facial detection to determine in what direction the person is facing. The controller may identify shoulders, neck and head of the person without detecting a face and can determine that the person is facing away from the image capturing device(s) with the angle based on the shoulder orientation. In response to determining that the face of the person is oriented toward the display device(s), method 600 proceeds to block 602. In response to determining that the face of the person is not oriented toward the display device(s) (and is thus not gazing at the display device(s)), method 600 returns to decision block 610.

With reference to FIG. 6B, in response to determining that the face of the person and the display device(s) are not identified within the field of view of the image capturing device(s) in decision block 614, method 600 includes determining whether the face is oriented and presumed to be gazing in a direction previously determined to be toward the display device(s) (decision block 618). In an example, the direction can be predominantly associated with the person entering user inputs into a user input device. In another example, the direction can be associated with gaze direction during a two-way communication session in which the person does speak. These instances can occur in previous sessions such as between two communication devices. The active communication implies that the person was gazing toward the display device(s) and was not doing something else. Instances such as this are associated with the person gazing at the display device(s). In response to determining that the face of the person is oriented in the direction previously determined to be toward the display device(s), method 600 returns to block 602. In response to determining that the face of the person is not oriented in the direction previously determined to be toward the display device(s) (and is thus not gazing at the display device(s)), method 600 returns to decision block 610.

Figure 7C:
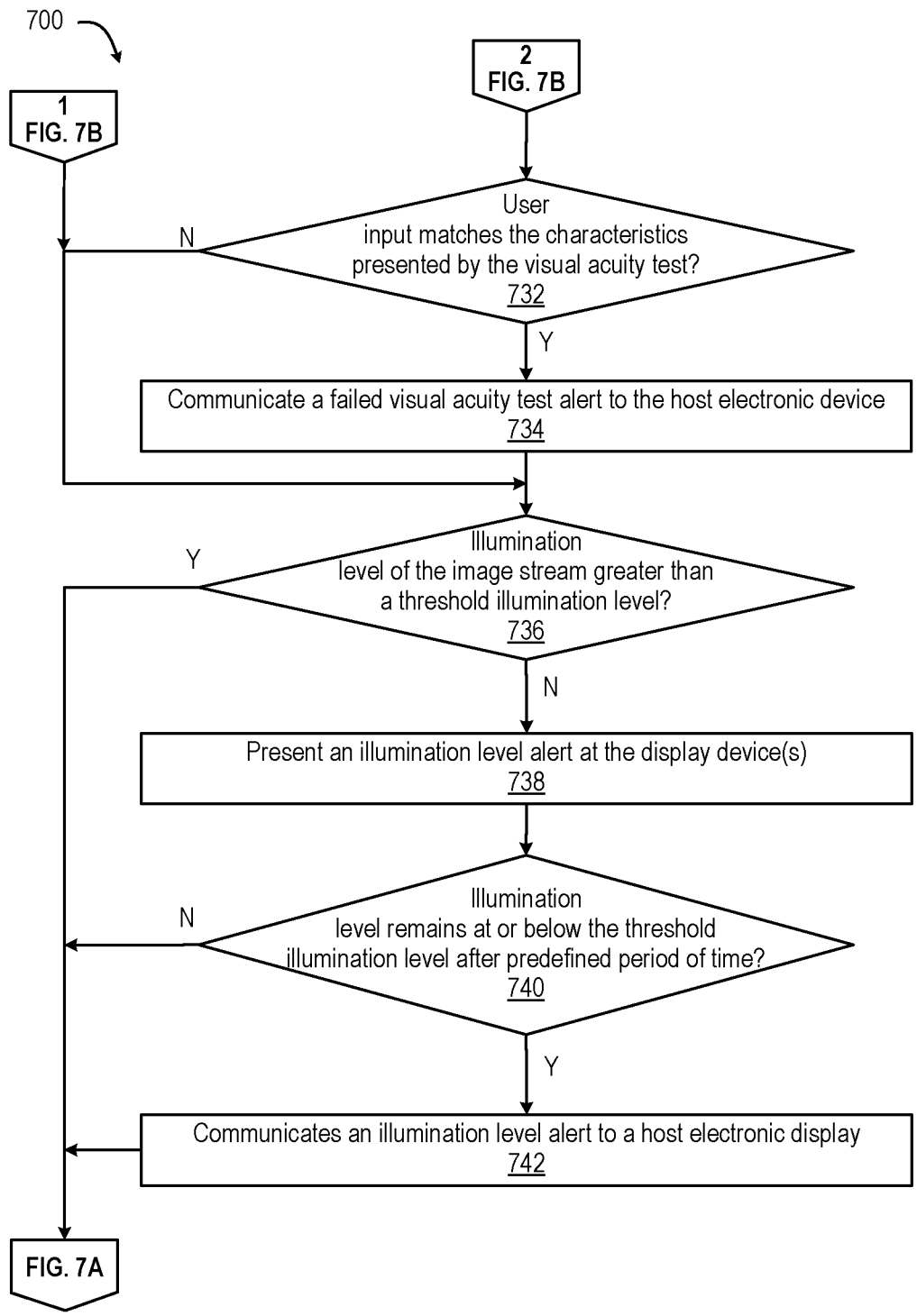

FIGS. 7A-7C (collectively FIG. 7) depict a flow diagram of a method for managing compliance with a policy requiring limited background noise, live image stream, completion of a visual acuity test, and adequate illumination of a participant who uses a communication device. Method 700 can be performed as an alternative to, or in parallel with, method 600 (FIG. 6) that is directed to compliance based on eye gaze and attentiveness. Method 700 includes identifying at least one policy applicable to a participant in the video communication session (block 702). In addition to encouraging attentiveness to the video communication session, the at least one policy can be enforced in parallel to further encourage other communication or educational objectives. Policies can be intended to enhance communication with other users and/or improve a user's experience. In an example, at least one policy can require that the local person who is participating in the video communication session be in relatively quiet environment. Noises create distractions to the local person, degrading effective listening, and can create distractions to remote participant(s) should the local participant be unmuted to the video communication session. In another example, at least one policy can ensure that the local person has enabled a live image stream at least for local monitoring and for monitoring by a host at a host electronic device. In one or more embodiments, the controller has sufficient access and control over the at least one image capturing device to detect whether any interventions have been made to spoof a live image stream with a recorded image stream.

In an additional example, at least one policy can ensure that the local person has provided an electronic device with sufficient display size for effective viewing. The at least one policy can further ensure that the local person has sufficiently mitigated any visual impairment, such as wearing of eyeglasses or contact lenses, is positioned sufficiently close to the display, and has selected a display format that enables effective visual recognition and reading. In a further example, at least one policy can ensure that the illumination level of the local person is sufficient for effective monitoring by an image capturing device. The illumination level can also be sufficient for providing an image stream to at least one second electronic device. The illumination level can also be sufficient to improve attentiveness by a person who is participating in the video communication session. For clarity, each of these four examples of policies are described as occurring sequentially. In one or more embodiments, fewer or more than four such policies are monitored and acted upon.

In one or more embodiments, method 700 includes producing a local audio stream with microphone(s) that detects a corresponding audio input (block 704). Method 700 includes determining whether a trigger event has occurred (decision block 706). In an example, during initial setup of the video communication session, the local person can be prompted to speak in order to capture a voice input. In response to determining that a trigger event has not occurred, method 700 proceeds decision block 720 (FIG. 7B). In response to determining that a trigger event has occurred, method 700 includes characterizing unique audio attributes of a voice of the person in the local audio stream for subsequent voice recognition (block 708). Method 700 includes, during a video communication session, receiving, via the network interface(s) and the network, a received audio stream from the video communication session (block 710). Method 700 includes presenting the received audio stream at the audio output device(s) as a local audio output (block 712). Method 700 includes determining a background noise level contained in the local audio stream by excluding the voice of the person and the audio output from the received audio stream (block 714). Method 700 proceeds to block 716 of FIG. 7B.

With reference to FIG. 7B, method 700 includes comparing the background noise level with a non-compliant noise level and presenting an alert on the display device(s) in response to the background noise level exceeding a non-compliant noise level (block 716). Method 700 includes communicating the alert to the host electronic device in response to the background noise level exceeding the non-compliant noise level for a threshold amount of time (block 718).

In response to determining that a trigger event has not occurred in decision block 706 or after block 718, in one or more embodiments, method 700 includes determining whether the image capturing device(s) is producing a live image stream that is communicated to the host electronic device (decision block 720). This determination ensures that the visual compliance management functionality is enabled by having a live image stream from each electronic device. Granularity in detecting a source of a problem with providing a live feed may quickly obviate an inadvertently mistaken configuration of one or more electronic devices. Identifying malfunctions or network difficulties may be used for triggering maintenance actions. By contrast, the granularity in detecting the source of the problem may deter intentional avoidance of automated compliance management. In response to determining that the image capturing device(s) is not producing a live image stream that is communicated to the host electronic device, method 700 includes communicating an invalid image stream alert to the host electronic device (block 722). Providing no image stream triggers an invalid image stream alert. In an example, an invalid image stream alert may indicate a hardware failure of the communication device. In another example, an invalid image stream alert may indicate that the software settings for the image capturing device have been disabled. In an additional example, an invalid image stream alert can indicate that the image capturing device has been incorrectly position or obscured, preventing capturing of an image of the person. In a further example, an invalid image stream alert may indicate a malicious attempt to spoof a live stream with a recorded image. In one or more embodiments, a controller may not have sufficient access to the image capturing device of the particular electronic device to determine if the image feed is live and local to the particular electronic device. To verify that the image feed is live, the controller may communicate an alert for a corresponding person using the particular electronic device to wave or to raise a specified number of fingers and confirm the correct response within a pre-defined period of time without a video feed discontinuity.

In response to determining that the image capturing device(s) is producing a live image stream that is communicated to the host electronic device in decision block 720 or after block 722, in one or more embodiments, method 700 includes determining whether a visual acuity trigger has occurred (decision block 724). In an example, the visual acuity trigger can be a random or routine check of each person participating in the video communication session to confirm adequate display size and adequately compensated human vision. In another example, the visual acuity trigger can automatically occur at a network device, a host electronic device, or the electronic device, when a particular person is detected as being inattentive or failing to respond with accurate user inputs to displayed questions. In an additional example, the visual acuity trigger can be manually triggered by a host at a host electronic device. In response to determining that a visual acuity trigger has not occurred, method 700 proceeds to 736 (FIG. 7C).

In response to determining that a visual acuity trigger has occurred, method 700 includes presenting a visual acuity test on the display device(s) (block 726). The visual acuity test can evaluate whether a display size of the display device(s) is sufficient to display information that can be recognized or read by a person at the electronic device. In one or more embodiments, the controller of the electronic device can identify a configuration of the electronic device, including the display size. Using the image stream from the image capturing device(s), the controller can determine how far back from the display device(s) that the person is. With this information, the controller can present a visual acuity test to determine whether the person is too far away from the display and/or whether the person has limited vision capabilities that require augmentation or mitigation. Method 700 includes prompting for a user input in response to the visual acuity test (block 728). Method 700 includes comparing the user input to characteristics presented by the visual acuity test (block 730). Then method 700 proceeds to decision block 732 (FIG. 7C).

With reference to FIG. 7C, method 700 includes determining whether the user input matches the characteristics presented by the visual acuity test (decision block 732). In response to determining that the user input matches the characteristics presented by the visual acuity test, method 700 proceeds to block 736. In response to determining that the user input does not match the characteristics presented by the visual acuity test, method 700 includes communicating a failed visual acuity test alert to the host electronic device (block 734). In one or more embodiments, additional information is presented indicating a root cause of the failure in the response to the user input not matching the characteristics presented by the visual acuity test.

In response to determining that a visual acuity trigger has not occurred in decision block 724 (FIG. 7B) or after block 734, in one or more embodiments, method 700 includes determining whether an illumination level of the image stream is greater than a threshold illumination level sufficient for adequate visual monitoring of the person (block 736). In response to determining the illumination level of the image stream is greater than a threshold illumination level, method 700 returns to block 702 (FIG. 7A). In response to determining the illumination level of the image stream is not greater than (i.e., less than or equal to) than a threshold illumination level, method 700 includes presenting an illumination level alert at the display device(s) (block 738). Method 700 includes determining, after predefined period of time, whether the illumination level of the image stream remains at or below the threshold illumination level (block 740). In response to determining that the illumination level of the image stream has not remained at or below the threshold illumination level, method 700 returns to block 702 (FIG. 7A). In response to determining that the illumination level of the image stream has remained at or below (i.e., is less than) the threshold illumination level, method 700 includes communicating an illumination level alert to a host electronic display (block 742). Then method 700 returns to block 702 (FIG. 7A).

Figure 8A:
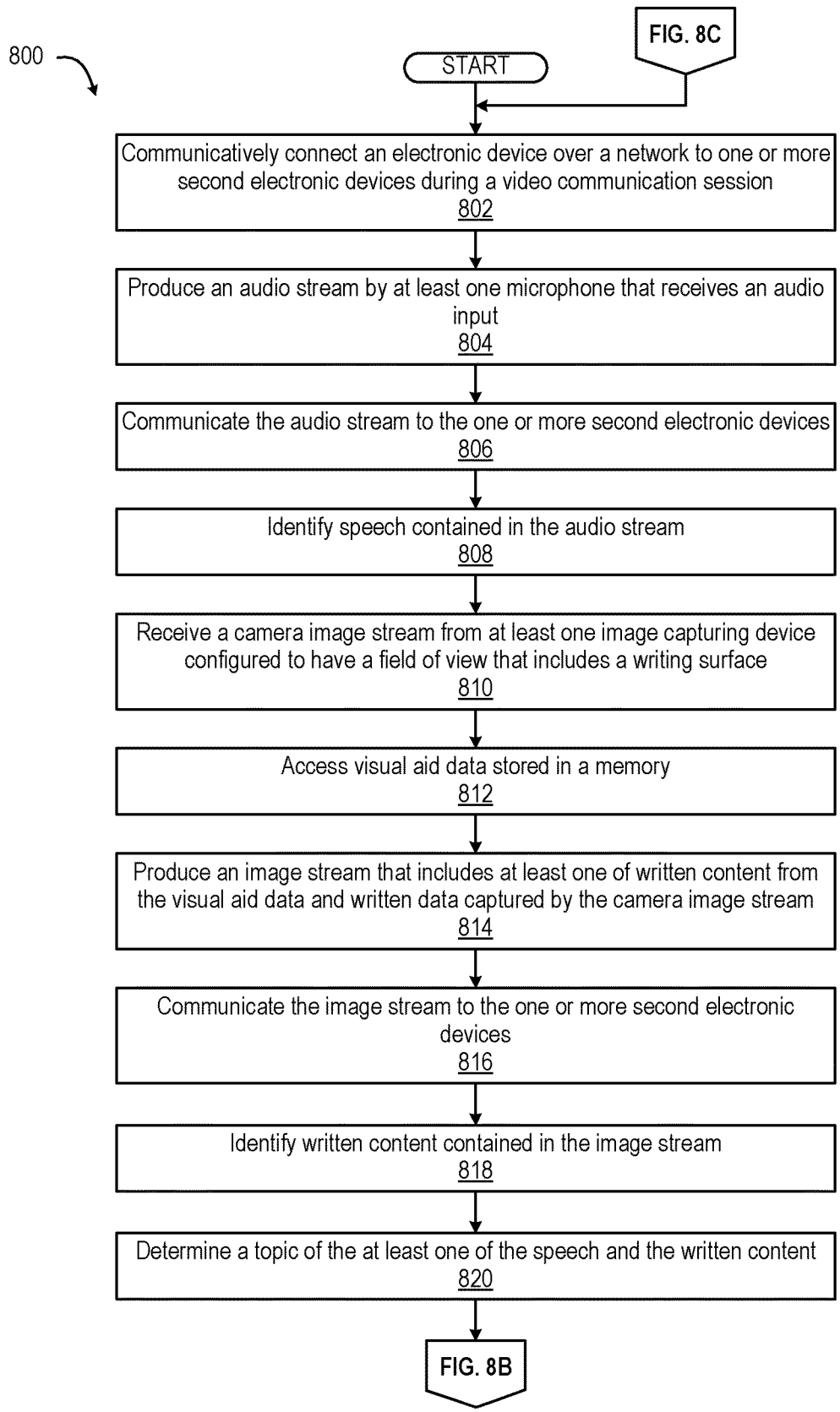

FIGS. 8A-8B (collectively FIG. 8) depict a flow diagram of method 800 for automatically creating quizzes based on recent speech or written content presented to a participant to assess attentiveness. Method 800 includes communicatively connecting an electronic device over a network to one or more second electronic devices during a video communication session (block 802). Method 800 includes producing an audio stream by at least one microphone that receives an audio input (block 804). Method 800 includes communicating the audio stream to the one or more second electronic devices (block 806). In one or more embodiments, the audio stream is part of a video stream that also includes at least one image stream. Method 800 includes identifying speech contained in the audio stream (block 808). In one or more embodiments, method 800 includes receiving a camera image stream from at least one image capturing device configured to have a field of view that includes a writing surface (block 810). In one or more embodiments, method 800 includes accessing visual aid data stored in a memory (block 812). In one or more embodiments, method 800 includes producing an image stream that includes at least one of written content from the visual aid data (e.g., screen share) and written data captured by the camera image stream (block 814). In an example, the written data is notes written on a white board or black board. Method 800 includes communicating the image stream to the one or more second electronic devices (block 816). Method 800 includes identifying written content contained in the image stream (block 818). Method 800 includes determining a topic of the at least one of the speech and the written content (block 820). Then method 800 proceeds to block 822 of FIG. 8B.

With reference to FIG. 8B, method 800 includes associating the topic with related text that is not equivalent to the at least one of the speech and the written content (block 822). Method 800 includes constructing a quiz question that includes at least one of: (i) a correct answer extracted from the at least one of the speech and the written content and (ii) at least one incorrect answer extracted from the related text (block 824). In one or more embodiments, the quiz question is a true/false question. In one or more embodiments, the quiz question is a multiple answer question. In one or more embodiments, the quiz question is drag and drop the answers with the appropriate questions. In one or more embodiments, the quiz question solicits a short essay answer. In one or more embodiments, the quiz question is another question format. Method 800 includes communicating the quiz question to at least one of the one or more second electronic devices to prompt for a response by a corresponding user of the at least one of the one or more second electronic devices (block 826). Method 800 includes receiving an answer within a predefined period of time from a first receiving device of the one or more second electronic devices (block 828). In one or more embodiments, not receiving an answer within the predefined period of time is deemed a null answer that is automatically incorrect. Method 800 includes determining an attentiveness score related to whether the answer is the correct answer (block 830). Method 800 includes communicating, to a host output device, the attentiveness score for the user associated with the first receiving device (block 832). Then method 800 returns to block 802 (FIG. 8A).

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one network interface that communicatively connects the electronic device over a network to one or more second electronic devices during a video communication session; and
   a controller communicatively coupled to the at least one network interface, and which:
   receives at least one image stream, each image stream produced respectively by an image capturing device of a corresponding second electronic device;
   identifies at least one person within the at least one image stream;
   produces attendance data by comparing the at least one person that is identified with a roster of at least one person expected to join the video communication session;
   determines participation data related to an amount of time that the at least one person is gazing toward the image capturing device of the corresponding second electronic device;
   determines the participation data in part based on accuracy of a response to a quiz question for a corresponding person associated with a particular second electronic device, the quiz question comprising at least one of: (i) a correct answer extracted from at least one of a speech and a written content of the host participant and (ii) at least one incorrect answer that is not extracted from at least one of the speech and the written content;
   communicates, to a host output device, the attendance data and the participation data of the at least one person during a duration of the video communication session; and
   communicates an alert to the corresponding second electronic device in response to determining that the at least one person is not gazing toward the corresponding image capturing device and has gazed away for a period of time that exceeds a threshold amount.

2. The electronic device of claim 1, wherein the controller:
   receives a host audio stream incorporating speech from a host participant, the host audio stream communicated to the one or more second electronic devices for presentation to a corresponding one or more person;
   receives a host image stream incorporating written content by the host participant, the host image stream communicated to the one or more second electronic devices for presentation to the corresponding one or more person;
   constructs the quiz question;
   communicates the quiz question to at least one of the one or more second electronic devices to prompt for a response by a corresponding user of the at least one of the one or more second electronic devices;

determines the accuracy of one of: (i) a response; and (ii) a null response from a particular second electronic device.

3. The electronic device of claim 1, wherein the controller:
identifies at least one garment within the at least one image stream from a particular second electronic device;
identifies compliance of the at least one garment with a clothing policy from among policy directives; and
communicates non-compliance data to the host output device for a person corresponding to the particular second electronic device based on determining that the at least one garment violates the clothing policy.

4. The electronic device of claim 3, wherein the controller identifies compliance of the at least one garment with a clothing policy from among policy directives comprising one or more of: (i) modesty; (ii) required uniform garment; and (iii) presence of an offending logo.

5. The electronic device of claim 1, wherein the controller:
in response to identifying one of: (i) a trigger received from a host user interface; and (ii) participation data below a threshold, communicates a visual acuity test to a particular second electronic device;
receives a user input to the visual acuity test from the particular second electronic device;
compares the user input to characteristics presented by the visual acuity test; and
communicates a failed test alert to the host electronic device in response to the user input not matching the characteristics presented by the visual acuity test.

6. The electronic device of claim 1, wherein the controller:
determines an illumination level of the image stream; and
presents an illumination level alert at one or more display devices in response to determining that the illumination level is less than a threshold illumination level.

7. The electronic device of claim 1, wherein the controller:
identifies an article that a particular person of the at least one person is required to use during the video communication session;
determines an amount of time that the particular person is not using the article during a duration of the video communication session; and
communicates non-compliance in response to determining that the amount of time that the particular person is not using the article exceeds a time threshold.

8. The electronic device of claim 1, wherein the controller:
determines, during the video communication session, incidents of non-compliance by a particular person with a policy associated with at least one of: (i) participation score; (ii) use of a required article; and (iii) wearing of permitted garments; and
in response to determining non-compliance by the particular person with the policy during the video communication session:
communicates a notice of the non-compliance with the policy to a corresponding second electronic device of the particular person;
communicates a request for an explanation of the non-compliance with the policy to the second electronic device; and
communicates, to the host output device, one of a received response and a null response along with the notice of non-compliance and an identity of the particular person.

9. The electronic device of claim 1, further comprising at least one image capturing device and an input device, both communicatively coupled to the controller, wherein the controller:
in response to a trigger from the input device:
triggers capture of a local image of an article via the at least one image capturing device;
identifies whether an identical article is identified within each of the at least one image streams from the respective at least one second electronic device;
generates compliance data comprising one of compliant and non-compliant for each of the at least one person corresponding to the respective at least one image streams; and
communicates the compliance data to the host output device.

10. A method comprising:
communicatively connecting an electronic device over a network to one or more second electronic devices during a video communication session;
receiving at least one image stream, each image stream produced respectively by an image capturing device of a corresponding second electronic device;
identifying at least one person within the at least one image stream;
producing attendance data by comparing the at least one person that is identified with a roster of at least one person expected to join the video communication session;
determining participation data related to an amount of time that the at least one person is gazing toward the image capturing device of the corresponding second electronic device;
determining the participation data in part based on accuracy of a response to a quiz question for a corresponding person associated with a particular second electronic device, the quiz question comprising at least one of: (i) a correct answer extracted from at least one of a speech and a written content of the host participant and (ii) at least one incorrect answer that is not extracted from at least one of the speech and the written content;
communicating, to a host output device, the attendance data and the participation data of the at least one person during a duration of the video communication session; and
communicating an alert to the corresponding second electronic device in response to determining that the at least one person is not gazing toward the corresponding image capturing device and has gazed away for a period of time that exceeds a threshold amount.

11. The method of claim 10, further comprising:
receiving a host audio stream incorporating speech from a host participant, the host audio stream communicated to the one or more second electronic devices for presentation to a corresponding one or more person;
receiving a host image stream incorporating written content by the host participant, the host image stream communicated to the one or more second electronic devices for presentation to the corresponding one or more person;
constructing the quiz question;
communicating the quiz question to at least one of the one or more second electronic devices to prompt for a response by a corresponding user of the at least one of the one or more second electronic devices;

determining accuracy of one of: (i) a response; and (ii) a null response from a particular second electronic device.

12. The method of claim 10, further comprising:
identifying at least one garment within the at least one image stream from a particular second electronic device;
identifying compliance of the at least one garment with a clothing policy from among policy directives; and
communicating non-compliance data to the host output device for a person corresponding to the particular second electronic device based on determining that the at least one garment violates the clothing policy.

13. The method of claim 12, further comprising identifying compliance of the at least one garment with a clothing policy selected from among the policy directives comprising one or more of: (i) modesty; (ii) required uniform garment; and (iii) presence of an offending logo.

14. The method of claim 10, further comprising:
in response to identifying one of: (i) a trigger received from a host user interface; and (ii) participation data below a threshold, communicating a visual acuity test to a particular second electronic device;
receiving a user input to the visual acuity test from the particular second electronic device;
comparing the user input to characteristics presented by the visual acuity test; and
communicating a failed test alert to the host electronic device in response to the user input not matching the characteristics presented by the visual acuity test.

15. The method of claim 10, further comprising:
determining an illumination level of the image stream; and
presenting an illumination level alert at one or more display devices in response to determining that the illumination level is less than a threshold illumination level.

16. The method of claim 10, further comprising:
identifying an article that a particular person of the at least one person is required to use during the video communication session;
determining an amount of time that the particular person is not using the article during a duration of the video communication session; and
communicating non-compliance in response to determining that the amount of time that the particular person is not using the article exceeds a time threshold.

17. The method of claim 10, further comprising:
determining, during the video communication session, incidents of non-compliance by a particular person with a policy associated with at least one of: (i) participation score; (ii) use of a required article; and (iii) wearing of permitted garments; and
in response to determining non-compliance by the particular person with the policy during the video communication session:
communicating a notice of the non-compliance with the policy to a corresponding second electronic device of the particular person;
communicating a request for an explanation of the non-compliance with the policy to the second electronic device; and communicating, to the host output device, one of a received response and a null response along with the notice of non-compliance and an identity of the particular person.

18. The method of claim 10, further comprising:
in response to a trigger from an input device of the electronic device:
triggering capture of a local image of an article via the at least one image capturing device;
identifying whether an identical article is identified within each of the at least one image streams from the respective at least one second electronic device;
generating compliance data comprising one of compliant and non-compliant for each of the at least one person corresponding to the respective at least one image streams; and
communicating the compliance data to the host output device.

19. A computer program product comprising:
a computer readable storage device; and
program code on the computer readable storage device that when executed by a processor associated with an electronic device, the program code enables the electronic device to provide functionality of:
communicatively connecting an electronic device over a network to one or more second electronic devices during a video communication session;
receiving at least one image stream, each image stream produced respectively by an image capturing device of a corresponding second electronic device;
identifying at least one person within the at least one image stream;
producing attendance data by comparing the at least one person that is identified with a roster of at least one person expected to join the video communication session;
determining participation data related to an amount of time that the at least one person is gazing toward the image capturing device of the corresponding second electronic device;
determining the participation data in part based on accuracy of a response to a quiz question for a corresponding person associated with a particular second electronic device, the quiz question comprising at least one of: (i) a correct answer extracted from at least one of a speech and a written content of the host participant and (ii) at least one incorrect answer that is not extracted from at least one of the speech and the written content;
communicating, to a host output device, the attendance data and the participation data of the at least one person during a duration of the video communication session; and
communicating an alert to the corresponding second electronic device in response to determining that the at least one person is not gazing toward the corresponding image capturing device and has gazed away for a period of time that exceeds a threshold amount.

20. The computer program product of claim 19, wherein the program code enables the electronic device to provide the functionality of:
receiving a host audio stream incorporating speech from a host participant, the host audio stream communicated to the one or more second electronic devices for presentation to a corresponding one or more person;

receiving a host image stream incorporating written content by the host participant, the host image stream communicated to the one or more second electronic devices for presentation to the corresponding one or more person;

constructing the quiz question;

communicating the quiz question to at least one of the one or more second electronic devices to prompt for a response by a corresponding user of the at least one of the one or more second electronic devices;

determining the accuracy of one of: (i) a response; and (ii) a null response from a particular second electronic device.

\* \* \* \* \*